April 28, 1953
J. C. GOLNICK
2,636,528
QUICK-ACTING "C" CLAMP
Filed April 24, 1948
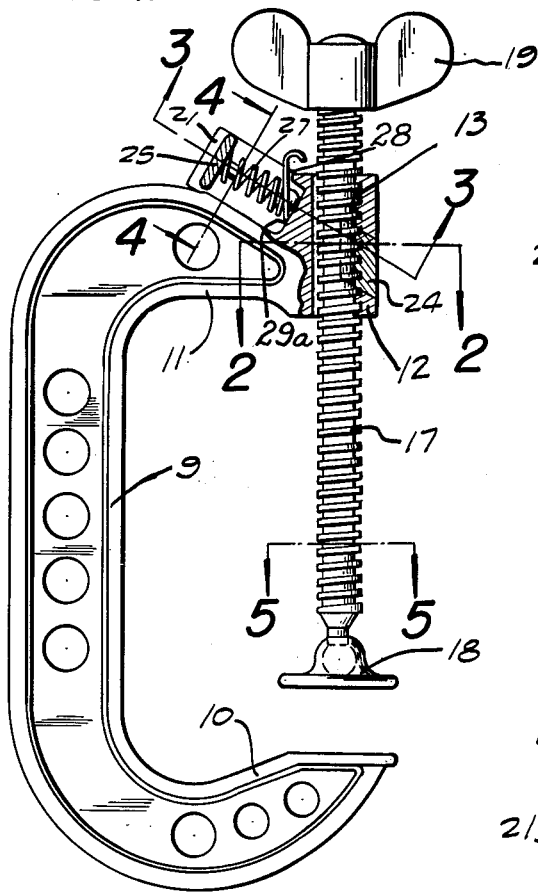
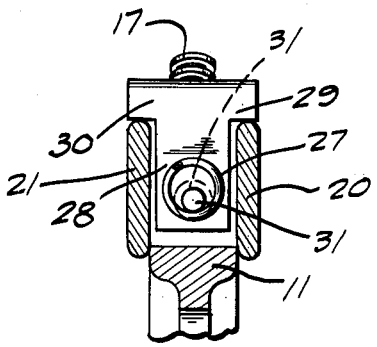
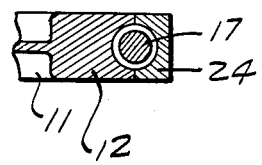
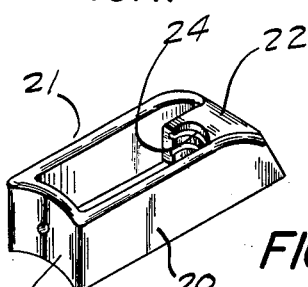
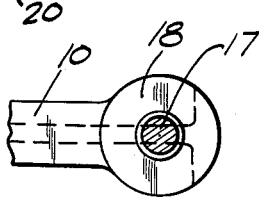
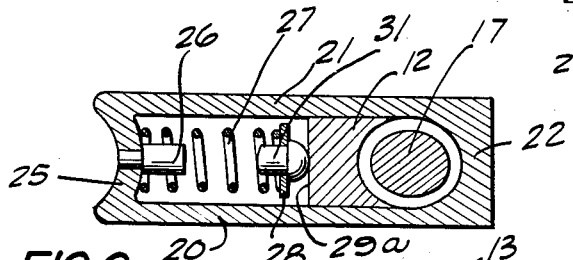
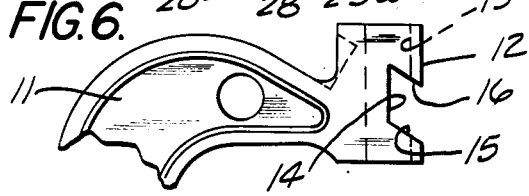
INVENTOR.
JOHN C. GOLNICK
BY
Thos. Donnelly
ATTORNEY.

Patented Apr. 28, 1953

2,636,528

UNITED STATES PATENT OFFICE 2,636,528

QUICK-ACTING C CLAMP

John C. Golnick, Richmond, Va.

Application April 24, 1948, Serial No. 23,077

3 Claims. (Cl. 144—305)

My invention relates to a new and useful improvement in a quick acting clamp adapted for clamping articles together while being worked upon, the clamp commonly being referred to as a quick acting C clamp.

It is an object of the present invention to provide a clamp of this class so arranged and constructed that a screw threaded into clamping position may be easily and quickly released out of clamping position.

In such clamps the pieces are engaged against one leg of the clamp body and a presser foot which is swivelly mounted on the screw which is threaded to provide the clamping action. In many operations it is desirable after the work has been completed that the screw can be easily and quickly withdrawn to allow ample space between the presser foot and the engaging leg to insert other material to be worked upon. At the same time it is necessary that this releasing mechanism is such that it cannot be released accidentally.

It is another object of the present invention to provide a releasing mechanism so arranged and constructed that the screw may be easily and quickly released but only after a part of the clamping has been released on the screw.

Another object of the invention is the provision of a clamp of this class which will be simple in structure, economical to manufacture, durable, compact, and highly efficient in use.

Other objects will appear hereinafter.

Fig. 1 is a side elevational view of the invention with parts broken away and parts shown in section, Fig. 2 is a fragmentary sectional view taken on line 2—2 of Fig. 1, Fig. 3 is a sectional view taken on line 3—3 of Fig. 1, Fig. 4 is a fragmentary sectional view taken on line 4—4 of Fig. 1, Fig. 5 is a sectional view taken on line 5—5 of Fig. 1, Fig. 6 is a fragmentary side elevational view of the clamping mechanism with the nut forming mechanism removed.

Fig. 7 is a perspective view of a retainer and nut forming member used in the invention.

As shown in the drawings the clamp embodies the body 9 having an engaging leg 10 at one end and a supporting leg 11 at the opposite end, the leg 11 being provided with a head 12 through which is formed a bore or passage 13. This head 12 is provided with a recess 14 leading into the passage 13 from one side and the recess having the upper and lower faces 15 and 16 respectively inclined to the axis of the bore 13. This bore 13 is free from threads and projected through the bore 13 is the screw 17 having the presser foot 18 swivelly mounted thereon and provided at the upper end with the wing nut 19 whereby the screw 17 may be rotated. A retainer is provided embodying the oppositely disposed walls 20 and 21 and the end wall 22 having the nut forming portion 24 thereon and provided with teeth for meshing with the teeth on the screw 17. The teeth on the nut forming portion 24 do not extend completely around the screw 17 but substantially half the distance or slightly less. An end wall 25 is also mounted on this retainer and projecting inwardly from this end wall is a stud or pin 26 which centers one end of a coil spring 27, the other end of this coil spring 27 being centered by the stud 31 which is carried by the plate 28. This plate 28 is provided with lateral extensions 29 and 30 and plate 28 is adapted to slidably engage between the walls 21 and 22. The head of the stud 31 is adapted to bear against the bottom of the recess 29a formed in the one side of the head 12.

In assembling the structure the retainer is positioned so as to embrace the head 12 with the nut forming portion 24 seated in the recess 14. The spring 27 and the plate 28 are in the position shown in Fig. 1. By pressing downwardly on the retainer the nut forming portion may be disengaged from the recess 14 whereupon the screw 17 may be passed through the passage or bore 13 prior to the mounting of the presser foot 18 on the screw.

After the structure has been assembled as shown in Fig. 1, the device may be used for clamping purposes and when material is clamped between the end of the leg 10 and the presser foot 18 the member 24 will serve as the nut in the threading operation to effect this clamping. As pressure is exerted upon the article to be clamped the pressure on the nut forming member will be upwardly and due to the incline surfaces 15 and 16 the nut forming member will have a tendency to move inwardly of the screw 17 thus more securely engaging the screw 17 and preventing any disengagement of the threads on the nut forming member with the threads of the screw 17. In order to release the nut forming member from the screw it will be necessary to move the retainer downwardly diagonally from the position shown in Fig. 1. However, when the clamping pressure is exerted on the material clamped, the pressure on the nut forming member will be directly opposed to the direction of movement of the retainer which would be necessary to effect a release of the nut forming member, with a consequence that the releasing movement cannot be accomplished. It is necessary that the screw 17 be backed off a couple of the turns in order to release the pressure. After the screw has been reversely turned two or three times the retainer may be very easily moved downwardly so that the nut-forming member will disengage from the screw 17, whereupon the screw 17 may be lifted upwardly to provide the desired space between the member 18 and the end of the leg 10. While this provides an easy and quick method of releasing the screw to form a wide opening between the presser foot 18 and the end leg 10 it also affords a mechanism where undue release could not be effected. In other words, when the clamping has been accomplished and the article is clamped between the end of the leg 10 and the member 18 the functioning or operation of the releasing mechanism is practically impossible. Experience has shown that a clamp arranged in this manner is most efficient in use as it permits a quick removal of the presser foot away from the clamped material while at the same time the necessary security and safety desired in a mechanism of this type is present.

What I claim is:

1. In a clamp of the class described a supporting body; a head on said body having a passage formed therethrough and provided on one side with a recess extending inwardly from the outward side of said head into said passage, said recess having upper and lower sides inclined to the axis of said passage; a threaded screw projected through said passage and moveable longitudinally thereof; an abutment jaw on said body positioned in alignment with said screw; a frame; a nut forming member mounted on and projected inwardly from one end of said frame, and engageable in said recess and provided on its inner side with threads engaging the threads of said screw, said frame embracing said head and projecting outwardly beyond the same at the side opposite to the side in which said recess is formed; a spring positioned in said frame and engaging at one end the inner surface of an end wall of said frame; a plate; a stud projected through said plate, and extending from opposite faces thereof, one end of said stud entering the opposite end of said spring, and the opposite end of said stud engaging in a recess formed in said head within the marginal limits of said frame, said plate extending into said frame; and a gripping portion on said plate extending beyond said frame.

2. In a clamp of the class described, a supporting body; a head on said body having a passage formed therethrough and provided on one side with a recess extending inwardly from the outer side of said head into said passage, the upper and lower walls of which recess extend at an angle with respect to the axis of said passage; a threaded screw projected through said passage and movable longitudinally thereof; an abutment jaw on said body positioned in alignment with said screw; a presser member on one end of said screw for clamping an object against said abutment jaw; a frame embracing said head and extended angularly to the axis of said screw; a nut-forming member mounted on and projected inwardly from one end of said frame and engageable in said recess and provided on its inner face with threads engaging the threads of said screw, said frame projecting outwardly from said head at the side opposite to the side in which said recess is formed; a plate inserted into said frame between said head and the outwardly projecting side of said frame, said plate lying in a plane parallel to the axis of said screw; and a coil spring positioned in said frame and engaging at one end with the end wall of said frame and at its opposite end with the face of said plate, the axis of said spring being angular to the plane of said plate.

3. In a clamp of the class described, a supporting body; a head on said body having a passage formed therethrough and provided on one side with a recess extending inwardly from the outer side of said head into said passage, the upper and lower walls of which recess extend at an angle with respect to the axis of said passage; a threaded screw projected through said passage and movable longitudinally thereof; an abutment jaw on said body positioned in alignment with said screw; a presser member on one end of said screw for clamping on an object against said abutment jaw; a frame embracing said head and extended angularly to the axis of said screw; a nut-forming member mounted on and projected inwardly from one end of said frame and engageable in said recess and provided on its inner face with threads engaging the threads of said screw, said frame projecting outwardly from said head at the side opposite to the side in which said recess is formed; a plate inserted into said frame between said head and the outwardly projecting side of said frame, said plate lying in a plane parallel to the axis of said screw; and a coil spring positioned in said frame and engaging at one end with the end wall of said frame and at its opposite end with the face of said plate, the axis of said spring being angular to the plane of said plate; and an element carried by said plate engaging said opposite end of said screw and retaining the same in position in said frame.

JOHN C. GOLNICK.

References Cited in the file of this patent

UNITED STATES PATENTS

| Number | Name | Date |
| --- | --- | --- |
| 150,900 | Silver et al. | May 12, 1874 |
| 228,437 | Bellows | June 8, 1880 |
| 851,416 | Hardy | Apr. 23, 1907 |
| 1,380,653 | Kilgour | June 7, 1921 |
| 1,804,007 | Golnick | May 5, 1931 |
| 2,463,263 | Gordon | Mar. 1, 1949 |